US008726238B2

(12) United States Patent
Duesterwald et al.

(10) Patent No.: US 8,726,238 B2
(45) Date of Patent: May 13, 2014

(54) INTERACTIVE ITERATIVE PROGRAM PARALLELIZATION BASED ON DYNAMIC FEEDBACK

(75) Inventors: Evelyn Duesterwald, Yorktown Heights, NY (US); Robert M. Fuhrer, Hawthorne, NY (US); Vijay Saraswat, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 12/709,712

(22) Filed: Feb. 22, 2010

(65) Prior Publication Data

US 2011/0209119 A1 Aug. 25, 2011

(51) Int. Cl.
*G06F 9/44* (2006.01)

(52) U.S. Cl.
USPC ........... 717/122; 717/136; 717/149; 717/151; 712/241

(58) Field of Classification Search
USPC ................. 717/100–110, 122–136, 149–161; 712/23, 203–241
See application file for complete search history.

(56) References Cited

U.S. PATENT DOCUMENTS

| | | | | |
|---|---|---|---|---|
| 5,151,991 A * | 9/1992 | Iwasawa et al. | | 717/150 |
| 5,634,059 A * | 5/1997 | Zaiki | | 717/160 |
| 5,809,308 A * | 9/1998 | Tirumalai | | 717/161 |
| 2006/0212843 A1* | 9/2006 | Zaky et al. | | 717/106 |
| 2006/0241909 A1* | 10/2006 | Morgan et al. | | 702/183 |
| 2009/0172633 A1* | 7/2009 | Tsyganskiy et al. | | 717/104 |
| 2009/0222799 A1* | 9/2009 | Stewart et al. | | 717/143 |
| 2009/0259612 A1* | 10/2009 | Hanson | | 706/47 |
| 2010/0070948 A1* | 3/2010 | Rama et al. | | 717/105 |

OTHER PUBLICATIONS

Banerjee, Utpal, et al. "Automatic program parallelization." Proceedings of the IEEE 81.2 (1993): pp. 211-243.*
Blume, William, and Rudolf Eigenmann. "Performance analysis pf parallelizing compilers on the Perfect Benchmarks programs." Parallel and Distributed Systems, IEEE Transactions on 3.6 (1992): pp. 643-656.*
Chen, Michael K., and Kunle Olukotun. "The Jrpm system for dynamically parallelizing Java programs." Computer Architecture, 2003. Proceedings. 30th Annual International Symposium on. IEEE, 2003, pp. 1-12.*

* cited by examiner

*Primary Examiner* — Satish Rampuria
(74) *Attorney, Agent, or Firm* — Scully, Scott, Murphy & Presser, P.C.; Louis J. Percello, Esq.

(57) ABSTRACT

Interactive iterative program parallelization based on dynamic feedback program parallelization, in one aspect, may identify a ranked list of one or more candidate pieces of code each with one or more source refactorings that can be applied to parallelize the code, apply at least one of the one or more refactorings to create a revised code, and determine performance data associated with the revised code. The performance data may be used to make decisions on identifying next possible ranked list of refactorings.

21 Claims, 4 Drawing Sheets

INTERACTIVE ITERATIVE PROGRAM PARALLELIZATION BASED ON DYNAMIC FEEDBACK

STATEMENT REGARDING FEDERALLY SPONSORED RESEARCH OR DEVELOPMENT

This invention was made with Government support under Contract No.: HR0011-07-9-0002 awarded by Defense Advanced Research Projects Agency (DARPA). The Government has certain rights in this invention.

FIELD

The present application relates generally to computer systems and concurrent programming and more particularly to interactive iterative program parallelization based on dynamic feedback.

BACKGROUND

Producing parallel code is a complex task. Manual parallelization requires careful crafting of parallel code by highly skilled parallel programmers. Several parallel programming models have been developed to ease this challenging task and while these models successfully free the programmer from reasoning about certain tedious and complicated details, they still burden the programmer with the major conceptual tasks of parallelization and data distribution, along with reasoning about many complex details such as data dependencies and communication costs. Automatic parallelizing compilers exist for limited domains, mostly scientific application domains. Those compilers have been shown to be capable of automatically parallelizing programs that were written in a sequential language; however, in the general case outside of such specific application domains, parallelizing compilers are largely ineffective.

Refactorings are semantic-preserving source-to-source code transformations. Refactoring has traditionally been used in program maintenance to improve the structure and readability of code. Existing refactoring tools are typically destructive; the previous version of the source code is lost after the transformation has been applied.

The present disclosure, in one aspect, addresses the problem of how to enable programmers to build parallel applications for multi-core and other parallel machines through interactive tool-assisted concurrency refactoring of the code. Known solutions to this problem are based on either manual parallelization or automatic (compiler) parallelization. Inspite of many advances in parallel programming models, manual parallelization of code remains to be a difficult task that typically only a small number of highly trained class of programmers are able to conquer. Automatic parallelization has been successful when restricting the problem (mostly to regular loop dominated scientific applications) but has not yet provided a general solution to the problem.

BRIEF SUMMARY

A method and system for program parallelization are provided. The method, in one aspect, may include recording a history of source code versions of a program and recording performance data associated with the source code versions in the history. The method may also include predicting an expected benefit of one or more source refactorings for one or more candidate pieces of source code based at least on the performance data, and ranking the one or more candidate pieces of source code according to the prediction.

A system for program parallelization, in one aspect, may include a storage device and a processor operable to record a history of source code versions of a program in the storage device. The processor may be further operable to record performance data associated with the source code versions in the history. The processor also may be operable to predict an expected benefit of one or more source refactorings for one or more candidate pieces of source code based at least on the performance data and rank the one or more candidate pieces of source code according to the prediction.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

The present disclosure, in one aspect, provides a hybrid solution between manual and fully automatic parallelization. The parallelization process may be assisted with several tools (e.g., refactoring tool, refactometer, performance tool and/or others) to interactively guide the programmer through an incremental parallelization effort. The refactoring tool or the like functionality provides various parallelization choices. The refactometer or the like functionality identifies a ranked list of those choices based on history information and performance models. Parallelization choices may include choices for revising the code so that certain pieces of code can run in parallel. The refactoring tool, for example, may identify pieces of code in a given code that may be parallelized, i.e., run simultaneously or substantially simultaneously. In order to identify parallelization choices, the refactoring tool may perform semantic analyses of the program, for instance, to ensure that only semantic-preserving, i.e., safe, parallelization choices are offered to the programmer.

The programmer then selects a refactoring from the list produced by the refactometer, i.e., one or more choices for revising the code, for example to introduce/manipulate the program's parallelism, to alter the layout in memory and/or distribution of various data structures, or to rearrange loop structures to improve memory reference locality. The selected one or more refactorings are then applied to effect the changes to the program's code. The new code, i.e., the code with one or more refactorings applied, is executed. The one or more selected refactorings may be evaluated using one or more performance tools and the resulting performance data may be placed in the repository of the past transformation history to assess progress. The transformation process may incrementally continue until the programmer decides to conclude transforming the code, the performance tools indicate acceptable performance has been achieved, and/or the refactoring tool indicates that there are no longer any applicable transformations.

In one aspect, the system and method of the present disclosure may provide an interactive parallelization development loop in which the developer decides what transformations to apply at each step from a ranked list of safe transformations offered by the refactometer. In another aspect, the system and method may provide an intelligent decision making tool to produce a completely automatic incremental parallelization process, for example, without requiring developer's intervention.

The system and method of the present disclosure may incorporate the concepts of code refactoring into the code parallelization process in order to provide a novel hybrid approach that uses an interactive feedback loop to assist the programmer in parallelizing a sequential program and/or manipulating the parallelism and/or distribution of an already-parallel program through a series of code refactorings.

Figure 1:
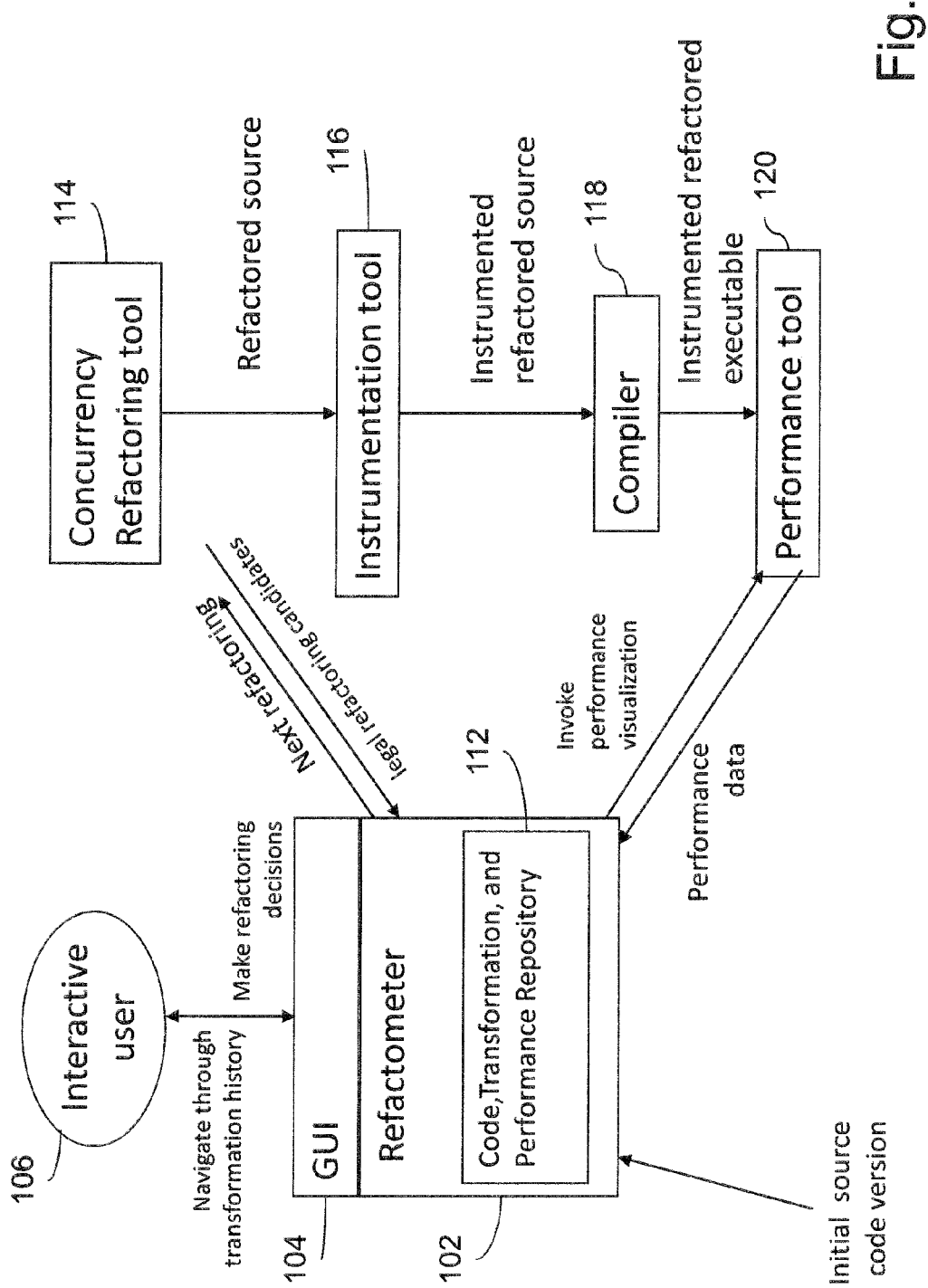
FIG. 1 is an architectural diagram illustrating a system of the present disclosure in one embodiment.

FIG. 1 is an architectural diagram illustrating a system of the present disclosure in one embodiment. A refactometer 102 may be a processing module that may include a graphical user interface (GUI) 104 and/or an application programming interface (API). The GUI 104 may be provided for interacting with the user acting as an intelligent agent also referred to as "oracles". An API may be provided as an interface to an automated intelligent tool acting as the intelligent agent. The refactometer 102 may also include a repository 112 storing information such as the program source code, the history of transformations applied, and performance data collected for various program runs under various combinations of refactorings. It should be understood that the repository 112 need not be locally co-located with the refactometer 102 as shown; rather, the repository 112 may be distributed across or over different systems, machines or platform, or networks, or even in a manner so as to be used in cloud computing. The refactometer 102 receives source code and queries the refactoring tool to determine a set of applicable (candidate) refactorings for the source code. Candidate refactorings refer to one or more revisions or code changes that can safely be made to the source code to parallelize the source code. While in this description, the code for parallelizing is referred to as "source code," it should be understood that the intermediate codes or objects may be also parallelized according to the system and method disclosed herein.

The concurrency refactoring tool 114 may be any software component or tool or the like that analyzes the given code and, for a given list of possible transformations (refactorings), identifies the set of semantically safe (i.e., legal) refactorings, for example, pieces of code that can be parallelized or run concurrently, and/or restructured or rewritten to make the code more readable, understandable and the like. The concurrency refactoring tool 114 then transmits the identified candidate refactorings to the refactometer 112. The refactometer 112 analyzes the identified candidates and produces a ranked list of the refactoring candidates. In one aspect, the rankings are assigned in order to reflect the expected performance benefits of each refactoring in the list. The refactometer may compute these rankings based on the history of previously applied refactorings and their performance, and/or based on a performance prediction model, and the like. The prediction model may be based on a formula that estimates the performance of the refactored code as a function of the structure, number and types of operations in the code, and possibly using performance data from previous runs of the code and information regarding the cost of key operations on the target execution platform (e.g., the cost of creating a new task, the cost of various forms of synchronization, and so on). The prediction model also could be based on simulation to estimate key performance metrics (e.g., total computer cycles executed, instructions per cycle (IPC)) without actually executing the code. The refactometer may also query and compare performance data across different alternative code versions from the transformation history to determine which refactoring to keep or remove from the candidate list.

The refactometer may present the ranked list of refactorings to the user 106 through a Graphical User Interface (GUI) 104. The user 106 may interact with the refactometer 102 to make decisions as to which of the identified candidate refactorings should actually be implemented or applied to revise the code into a more parallel, or otherwise improved code. The user 106 may make the decision, for example, based on the history of transformations, performance data and/or other data accessible from the refactometer 102, for example, via the GUI 104. This allows the user to interactively make intelligent decisions as to what refactorings should occur in the code. During the interaction, the user 106 may pull information from the refactometer 102 and navigate through the information, for example, transformation history, examining, for example, past refactorings for different types of code and different types of platforms that may have resulted in improved execution of codes or overall performance of a computer system running the code.

Additionally or alternatively, the refactometer may automatically make such decisions by simply selecting the highest ranked refactoring from the list.

Based on the refactoring decisions, the source code is revised or refactored accordingly. The history or information related to the refactoring is saved, for example, in the repository 112 for later retrieval or use. Further, performance data from executions of the code resulting from this refactoring may be saved and linked to the refactoring. This information may be used, for example, in the next round of iterations when determining what part of the program to transform, or what refactoring to select. The saved history of refactorings may be also used, for instance, to permit the code to be returned to a previous state, i.e., to undo the refactoring, if for instance, the refactoring resulted in worse performance or no improvement. The saved history can further be used to alter a parameter of a previously-applied refactoring, such as the number of times to unroll a particular loop.

An instrumentation tool 116 may be utilized to instrument the refactored code. Instrumenting the code, for instance, would cause the code, for instance, when it executes, to generate types of performance data that would allow for monitoring or analyzing the performance factors of the code. Such instrumented code might, for example, add entries to a log indicating when the program enters a certain phase of the computation, or it might enable fine-grained sampling of hardware performance counters during the execution of a core inner computational "kernel".

It should be noted that instrumenting the refactored code is optional and may take place before or after compiling the code that is refactored, or even before and after, and this disclosure does not limit the invention to one particular method.

A compiler 118 may be utilized to compile the refactored code into an executable. This step may not be needed if the refactored code is in the machine executable or runnable state already. The refactored code (e.g., the executable) then may be run or executed on a machine, for example, by a computer processor with one or more cores or the like. The executing code creates performance data that can be used to monitor and/or analyze its performance, for instance, as a result of the instrumentation. The data may be used to perform real-time analysis of the refactored code. The data may be also saved in the repository 112 for example, for later off-line analysis, use by the refactometer 102, and/or others. A performance tool 120 may be used to analyze the data in real-time and/or at a later time (e.g., off-line analysis).

The performance and other data obtained from running the refactored code may then be used as feedback to conduct more refactoring of the code. The present disclosure integrates and orchestrates several tools into a single feedback loop. These tools present the programmer with the information to drive the parallelization effort, assist in the safe and incremental transformation of the program into a better parallel program (through the application of a series of refactorings).

In one embodiment, transformations may be maintained as user-visible and manipulable entities in a tree that represents the programmer's exploration of the solution space, permitting convenient reasoning about "what-if" scenarios, and additional tuning of intermediate transformations. For example, such a structure may permit the user to review various combinations and sequences of transformations that had been applied in the past, to alter each one's parameters, to run additional executions under a given set of transformations, to remove transformations, or to insert additional transformations or others.

The system and method of the present disclosure may maintain both the original source and all intermediate results, including intermediate results that led up to configurations other than the one currently under consideration, unlike the traditional refactoring frameworks. This also may permit the programmer to maintain multiple versions, for instance, each tuned for a different platform.

Figure 3:
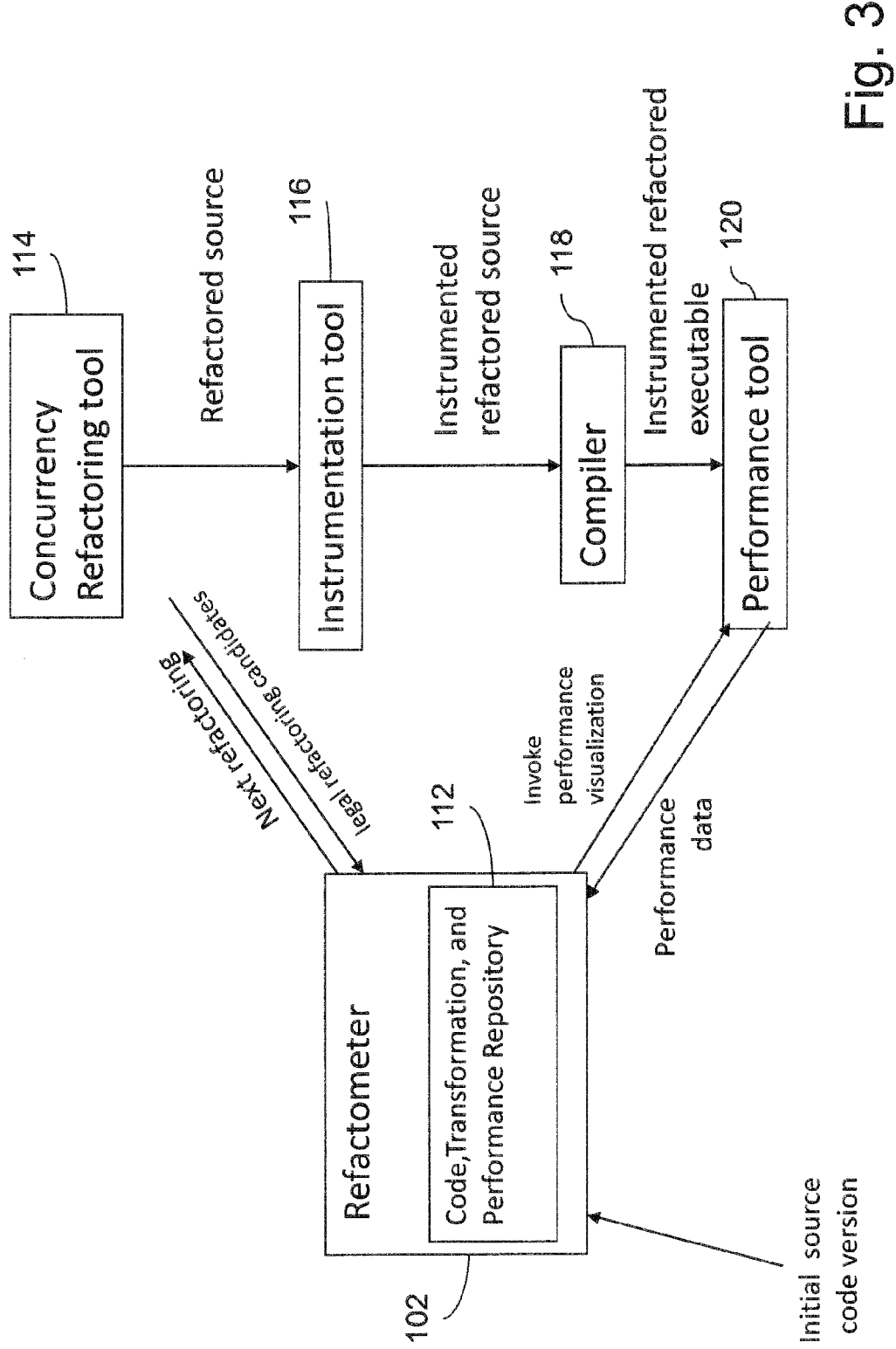
FIG. 3 is an architectural diagram illustrating a system of the present disclosure in another embodiment.

The feedback loop, that for example, includes selecting one or more refactorings, refactoring the code, executing the code, and using the results of the executed code as feedback for more refactoring, can be implemented with varying degrees of automation ranging from a primarily interactive user-driven loop to a fully automated loop, where the refactometer makes the refactoring selections. FIG. 3 illustrates an example of this configuration. In this example the refactometer 112 automatically selects the highest ranked refactoring from the ranked list of possible refactorings without requiring user intervention.

Figure 2:
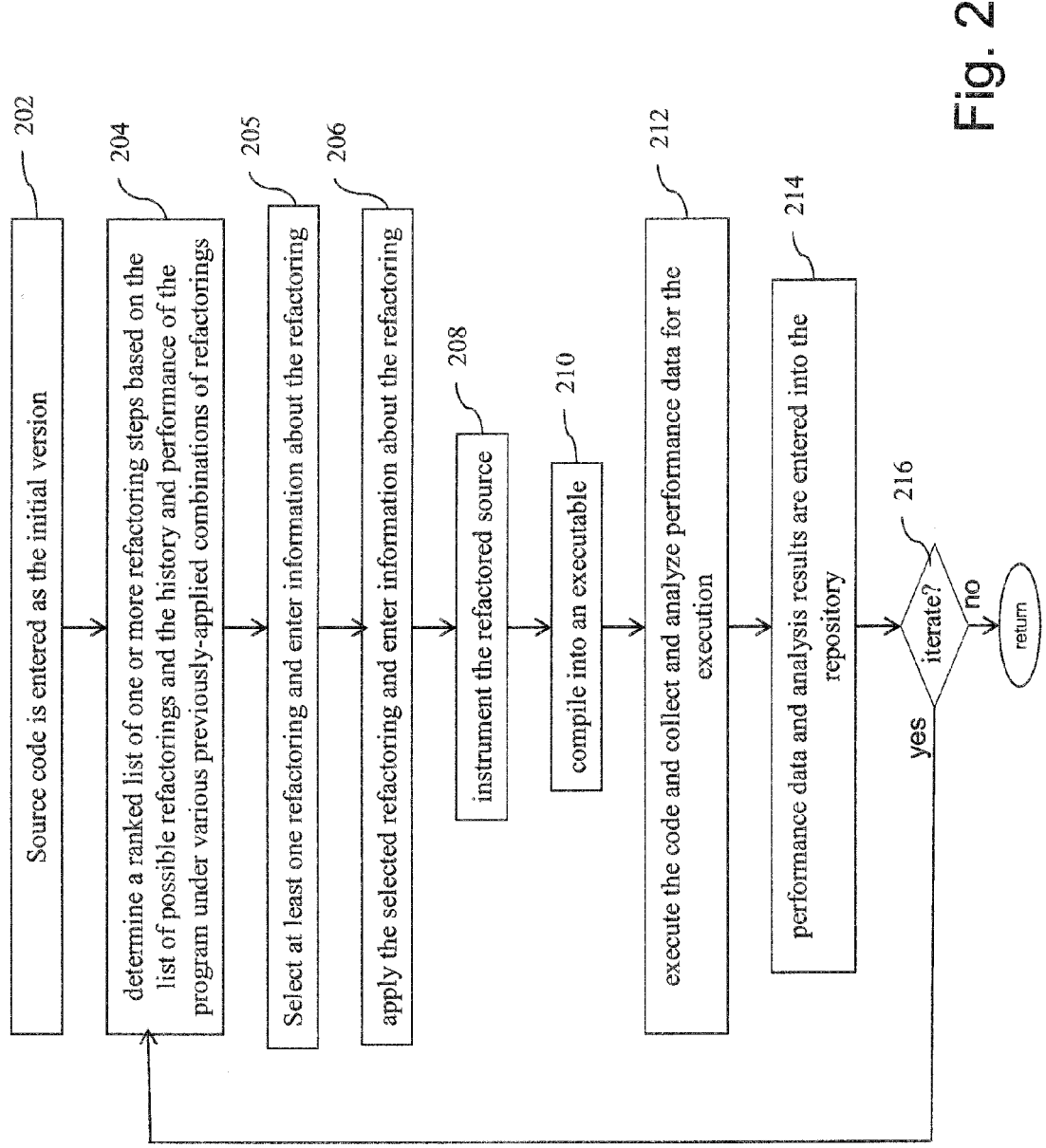
FIG. 2 is a flow diagram illustrating a method of the present disclosure in one embodiment.

FIG. 2 is a flow diagram illustrating a method of the present disclosure in one embodiment. At 202, source code is entered, for example, in the refactometer of the present disclosure or another like component. At 204, a ranked list of the next possible refactoring steps is determined based on the list of possible legal refactorings and the history and performance of past refactorings. At 205, one or more of the refactoring steps from the ranked list is selected. The selection may be driven by a user, for instance, via user interface, or the top ranked step may automatically be selected. At any time during the iteration of making refactoring decisions, at 205 no selection may be made, effectively terminating the iteration and declaring the current version the final version. The termination may occur, for example, if certain performance metrics have been met, if the improvement in the performance has diminished between iterations, or for other reasons.

At 206, the refactoring tool applies the next refactoring and enters information about the refactoring into the refactometer or the like component. Entering or storing the information about the refactoring maintains the history of which revisions have been made to the code.

At 208, the instrumentation tool instruments the refactored source, for instance, to output, log or provide the data that can be used to monitor and/or analyze the performance of the refactored source code.

At 210, the instrumented refactored source is compiled into an executable file or object. In another embodiment, the refactored source may be compiled before instrumentation, then the compiled code may be instrumented. Yet in another aspect, the instrumentation make take place both before and after the compilation.

At 212, a performance tool or the user may execute the code one or more times, and collect and analyze performance data associated with the execution(s).

At 214, the performance data and analysis results are saved or stored, for instance, entered into the refactometer for later use.

At 216, the steps shown at 204 through 214 may be repeated with more or different refactorings.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
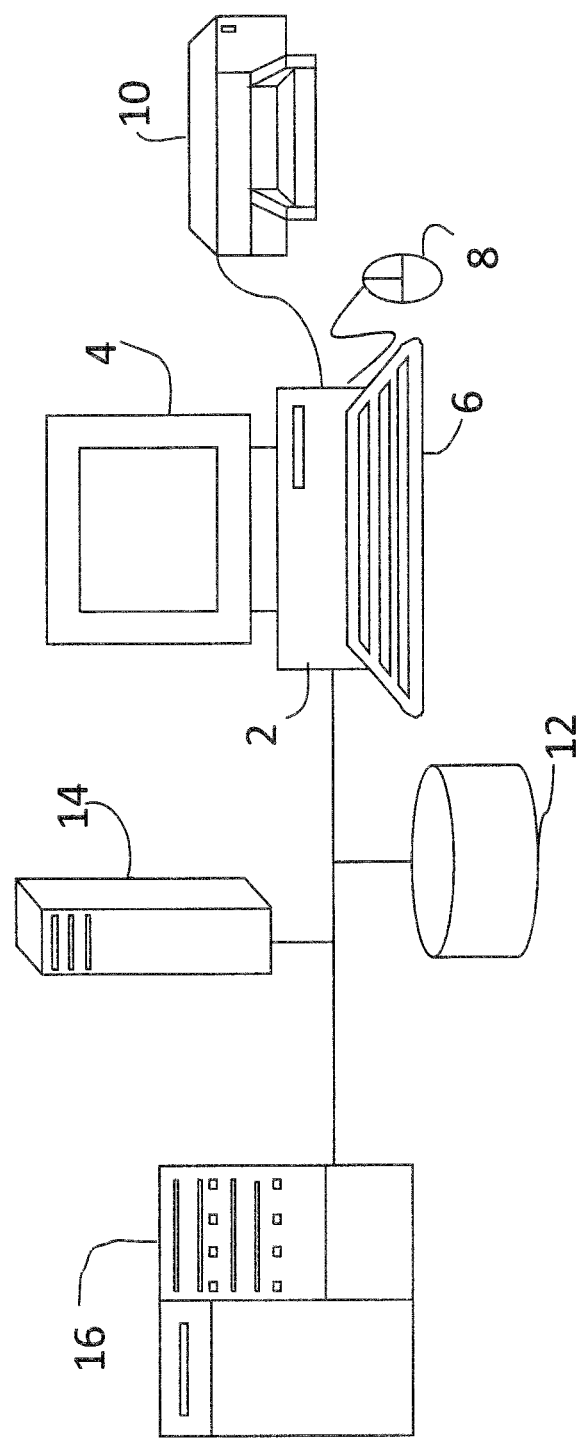
FIG. 4 illustrates an example of a computer system, in which the systems and methodologies of the present disclosure may be carried out or executed.

Referring now to FIG. 4, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 16, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 4, 6), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of identifying a ranked list of one or more candidate pieces of source code for use in parallelizing a given potentially concurrent user program, each candidate piece associated with one or more source refactorings, comprising:
    recording a history of source code versions of a program, wherein the recording a history of source code versions includes recording one or more of a plurality of code transformations that have been applied to the program and other programs in the past;
    recording performance data associated with the source code versions in the history;
    predicting an expected benefit of one or more source refactorings for one or more candidate pieces of source code based at least on the performance data, the one or more source refactorings comprising at least pieces of code that are capable of being parallelized and capable of running concurrently;
    ranking the one or more candidate pieces of source code according to the prediction; and
    allowing a user to navigate through past refactorings for different types of code and different types of platforms, and associated performance data associated with the past refactorings,
    wherein an interactive parallelization development loop is provided via a graphical user interface, in which a developer is allowed to decide which one or more of the plurality of code transformations to apply at each step from the ranked list of the candidate pieces of source code, and the method further comprises enabling the developer to undo an applied transformation or alter a parameter of a previously applied refactoring,
    wherein the expected benefit is determined for each of the different types of platforms based on at least cost of operations on the different types of platforms.

2. The method of claim 1, wherein the prediction of an expected benefit is based on specific information associated with a computing platform.

3. The method of claim 1, wherein the predicting an expected benefit is based on a mathematical performance model.

4. The method of claim 1, further including:
    selecting one or more candidate pieces of source code and associated one or more source refactorings from the ranked list;
    applying the associated one or more source refactoring to create a revised code;
    determining performance data associated with the revised code; and
    analyzing the performance data to evaluate benefit of the applied refactoring.

5. The method of claim 4, wherein the steps of selecting, applying, determining and analyzing are repeated iteratively.

6. The method of claim 4, wherein the step of determining includes:
    instrumenting the revised code;
    executing the instrumented code; and
    collecting performance data associated with executing of the instrumented code.

7. The method of claim 4, wherein the selecting further includes a user interactively selecting the one or more candidate pieces of code and associated one or more source refactoring from the ranked list.

8. The method of claim 4, wherein the selecting further includes a processor automatically selecting the one or more candidate pieces of code and associated one or more source refactoring from the ranked list.

9. A system for identifying a ranked list of one or more candidate pieces of source code for use in parallelizing a given potentially concurrent user program, each candidate piece associated with one or more source refactorings, comprising:
    a storage device;
    a processor operable to record a history of source code versions of a program in the storage device, wherein to record the history of source code versions includes recording one or more of a plurality of code transformations that have been applied to the program and other programs in the past, the processor further operable to the processor further operable to record performance data associated with the source code versions in the history, the processor further operable to predict an expected benefit of one or more source refactorings for one or more candidate pieces of source code based at least on the performance data the one or more source refactorings comprising at least pieces of code that are capable of being parallelized and capable of running concurrently, the processor further operable to rank the one or more candidate pieces of source code according to the prediction, the processor further operable to allow a user to navigate through past refactorings for different types of code and different types of platforms, and associated performance data associated with the past refactorings:

wherein an interactive parallelization development loop is provided via a graphical user interface, in which a developer is allowed to decide which one or more of the plurality of code transformations to apply at each step from the ranked list of the candidate pieces of source code, and the graphical user allows the developer to undo an applied transformation or alter a parameter of a previously applied refactoring, wherein the expected benefit is determined for each of the different types of platforms based on at least cost of operations on the different types of platforms.

10. The system of claim 9, wherein the prediction of an expected benefit is based on specific information associated with a computing platform.

11. The system of claim 9, wherein the predicting an expected benefit is based on a mathematical performance model.

12. The system of claim 9, wherein the processor is further operable to select one or more candidate pieces of source code and associated one or more source refactorings from the ranked list, apply the associated one or more source refactoring to create a revised code, determine performance data associated with the revised code, and analyze the performance data to evaluate benefit of the applied refactoring.

13. The system of claim 12, wherein to determine performance data, the processor is further operable to instrument the revised code, execute the instrumented code, and collect performance data associated with the executed instrumented code.

14. A non-transitory computer readable storage medium storing a program of instructions executable by a machine to perform a method of identifying a ranked list of one or more candidate pieces of source code for use in parallelizing a given potentially concurrent user program, each candidate piece associated with one or more source refactorings, the method comprising:

recording a history of source code versions of a program, wherein the recording a history of source code versions includes recording one or more of a plurality of code transformations that have been applied to the program and other programs in the past;

recording performance data associated with the source code versions in the history;

predicting an expected benefit of one or more source refactorings for one or more candidate pieces of source code based at least on the performance data, the one or more source refactorings comprising at least pieces of code that are capable of being parallelized and capable of running concurrently;

ranking the one or more candidate pieces of source code according to the prediction; and allowing a user to navigate through past refactorings for different types of code and different types of platforms, and associated performance data associated with the past refactorings, wherein an interactive parallelization development loop is provided via a graphical user interface, in which a developer is allowed to decide which one or more of the plurality of code transformations to apply at each step from the ranked list of the candidate pieces of source code, and the method further comprises enabling the developer to undo an applied transformation or alter a parameter of a previously applied refactoring, wherein the expected benefit is determined for each of the different types of platforms based on at least cost of operations on the different types of platforms.

15. The non-transitory computer readable storage medium of claim 14, wherein the prediction of an expected benefit is based on specific information associated with a computing platform.

16. The non-transitory computer readable storage medium of claim 14, wherein the predicting an expected benefit is based on a mathematical performance model.

17. The non-transitory computer readable storage medium of claim 14, further including:

selecting one or more candidate pieces of source code and associated one or more source refactorings from the ranked list;

applying the associated one or more source refactoring to create a revised code;

determining performance data associated with the revised code; and analyzing the performance data to evaluate benefit of the applied refactoring.

18. The non-transitory computer readable storage medium of claim 17, wherein the steps of selecting, applying, determining and analyzing are repeated iteratively.

19. The non-transitory computer readable storage medium of claim 17, wherein the step of determining includes:

instrumenting the revised code;

executing the instrumented code; and collecting performance data associated with executing of the instrumented code.

20. The non-transitory computer readable storage medium of claim 17, wherein the selecting further includes a user interactively selecting the one or more candidate pieces of code and associated one or more source refactoring from the ranked list.

21. The non-transitory computer readable storage medium of claim 17, wherein the selecting further includes a processor automatically selecting the one or more candidate pieces of code and associated one or more source refactoring from the ranked list.

* * * * *